(12) United States Patent
Kaneko et al.

(10) Patent No.: US 6,431,579 B1
(45) Date of Patent: Aug. 13, 2002

(54) TWIN-TYPE BABY BUGGY

(75) Inventors: Ryoichi Kaneko; Tokihiko Ikuno; Toshiro Yoshie, all of Tokyo-To (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/956,891

(22) Filed: Sep. 21, 2001

(30) Foreign Application Priority Data

Sep. 21, 2000 (JP) ........................................ 2000-286628

(51) Int. Cl.$^7$ .................................................. B62B 7/06
(52) U.S. Cl. ...................................... 280/642; 280/650
(58) Field of Search ............................... 280/650, 639, 280/642, 647, 655, 47.371, 47.38, 47.4, 47.41, 658, 42, 643

(56) References Cited

U.S. PATENT DOCUMENTS

| | | | | |
|---|---|---|---|---|
| 4,317,581 A | * | 3/1982 | Kassai | 280/644 |
| 4,538,830 A | * | 9/1985 | Nakao et al. | 280/647 |
| 4,545,599 A | * | 10/1985 | Kassai | 280/642 |
| 4,697,823 A | * | 10/1987 | Kassai | 280/644 |
| 5,181,735 A | * | 1/1993 | Onishi | 280/642 |
| 5,201,535 A | * | 4/1993 | Kato et al. | 280/30 |
| 5,205,579 A | * | 4/1993 | Kato et al. | 280/642 |
| 5,388,852 A | * | 2/1995 | Bigo et al. | 280/642 |
| 5,558,405 A | * | 9/1996 | Ishikura et al. | 297/487 |
| D382,516 S | * | 8/1997 | Hutchinson et al. | D12/129 |
| 5,722,682 A | * | 3/1998 | Wang | 280/642 |
| 6,241,273 B1 | * | 6/2001 | Gehr | 280/642 |
| 6,322,098 B1 | * | 11/2001 | Lan | 280/642 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

Arm rests 17a, 17b, 17c, and interconnection bars 224a, 24b, 24c, 24d are swung upward with respect to handle pipes 15a, 15b, 15c to thereby fold front leg 12a and a rear leg 14a to be substantially parallel with each other. At least one joint $16a_1, 16b_1, 22a_2, 22b_1, 23a_2, 23b_1, 25a_2, 25b_1$, are provided on one axial line, on the middle portion of each of both sides of a push handle 16 with respect to the interconnection of the intermediate handle pipe 15b with the push handle 16, on the middle portion of each of front interconnection bars 22a, 22b interconnecting the intermediate front leg 12b and the left and right front legs 12a, 12c, on the middle portion of each of rear interconnection bars 23a, 23b interconnecting the intermediate rear leg 14b and the left and right rear legs 14a, 14b, and on the middle portion of each of upper interconnection bars 25a, 25b interconnecting the intermediate interconnection bars 24b, 24c and the left and right interconnection bars 24a, 24d.

10 Claims, 9 Drawing Sheets

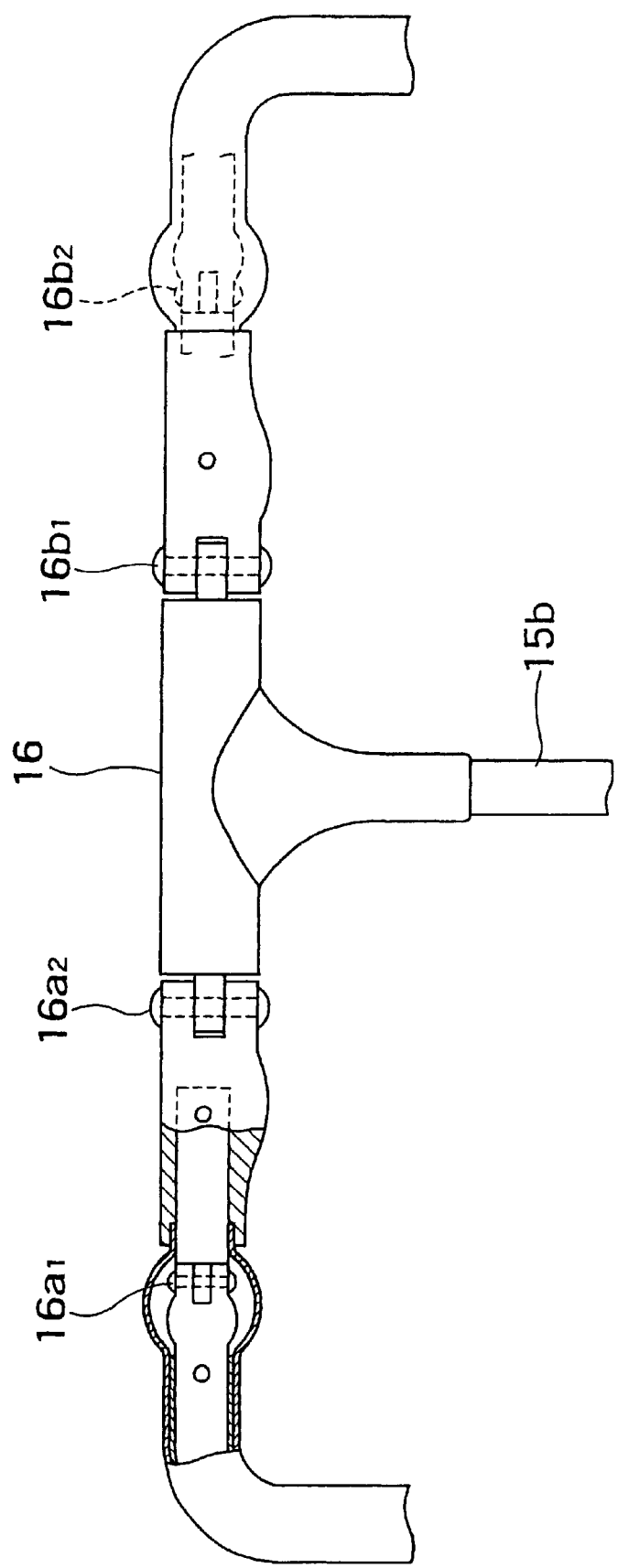
F I G. 5

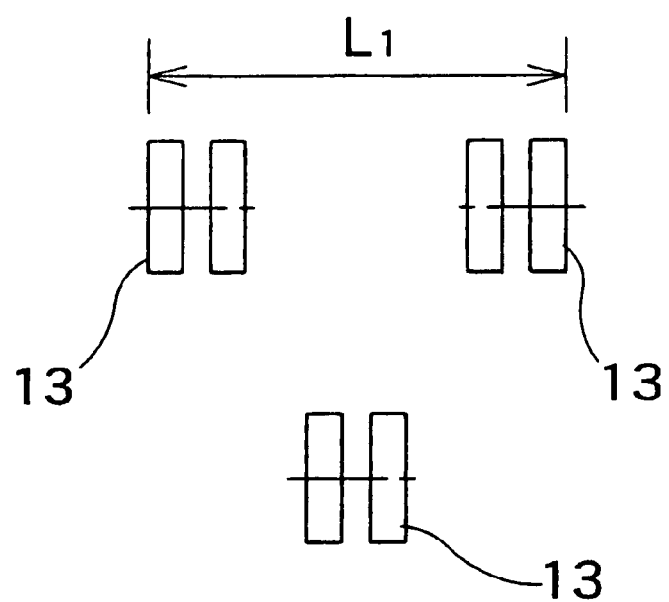
F I G. 6 A
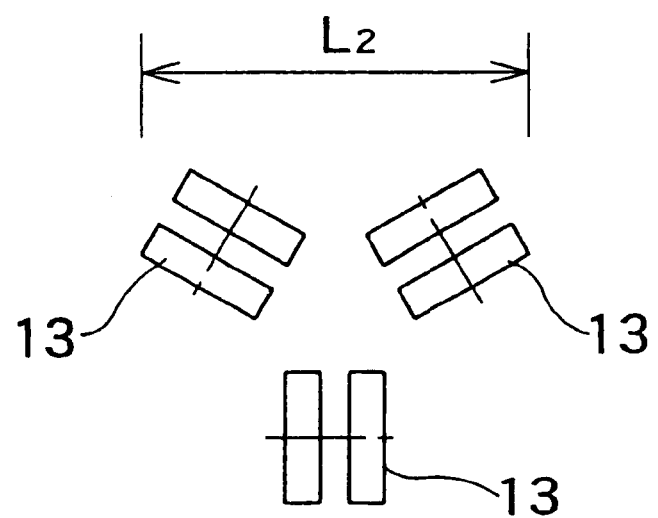
F I G. 6 B

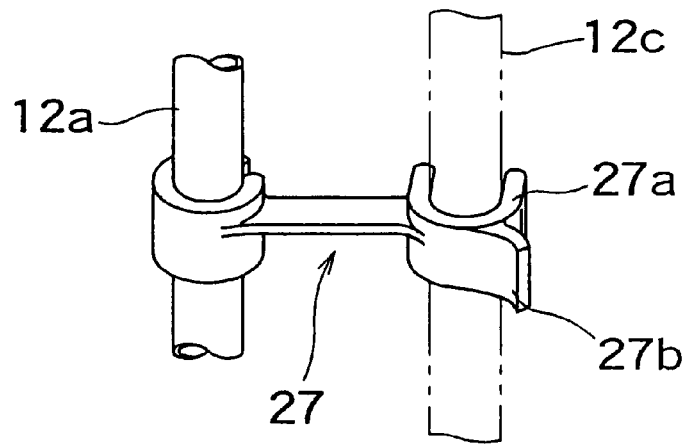
F I G. 8
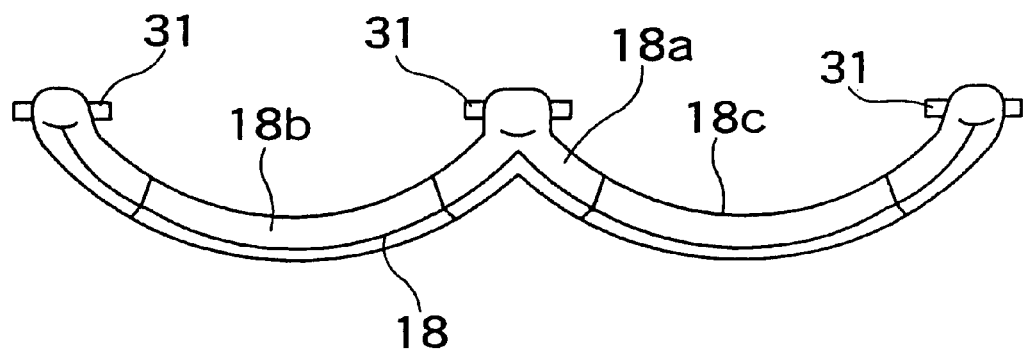
F I G. 9
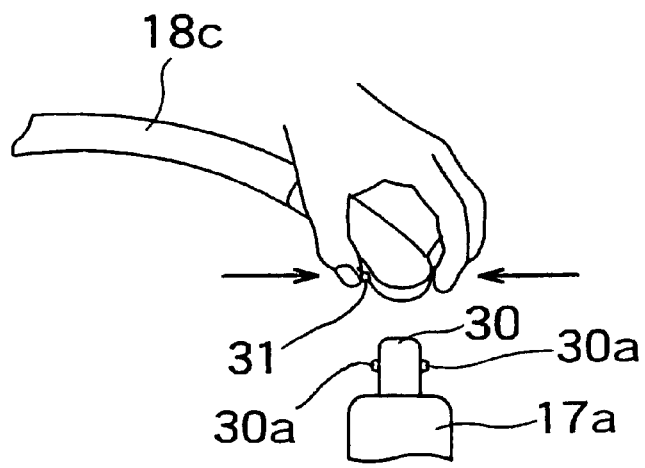
F I G. 10

TWIN-TYPE BABY BUGGY

TECHNICAL FIELD

The present invention relates to a twin-type baby buggy, more specifically to a twin-type baby buggy having two seats horizontally juxtaposed.

BACKGROUND ART

Twin-type baby buggies, each having two seats horizontally juxtaposed with each other for carrying two babies on both seats have been conventionally marketed.

However, such conventional twin-type baby buggies have considerably large lateral width, which has caused a disadvantage. For example, it is difficult to carry or store the baby buggies. Then, it has been proposed to fabricate baby buggies having laterally extended connection bar foldable upward so as to make the baby buggy laterally compact when the connection bar is folded. Even such proposed baby buggies, which can be made laterally compact, cannot have compact fore-and -aft width or height. To make the baby buggies laterally compact, three handle pipes corresponding to the respective front wheels and the respective rear wheels are projected backward.

When the baby buggies are pushed, both arms of a human being need to be wide spread to hold handle pipes on both sides, which disadvantageously makes it difficult to apply well a pushing force. When holding an intermediate handle pipe, it would be difficult to steer the baby buggies in a right direction.

DISCLOSURE OF THE INVENTION

An object of the present invention is to provide, in consideration of these disadvantages, a twin-type baby buggy which can be folded compact enough for stowage, carriage and other occasions.

The present invention relates to a twin-type baby buggy comprising a U-shaped push handle interconnected with three handles pipes extended parallel with each other; front legs with front wheels mounted on; rear legs with rear wheels mounted on; arm rests each having one end pivotally connected to the corresponding handle pipe, the other end pivotally connected to the corresponding front leg and the middle portion connected to the corresponding rear leg; and interconnection bars interconnecting the front legs to the respective corresponding handle pipes, the arm rests and the interconnection bars being swung upward with respect to the handle pipes to bring the front legs and the rear legs substantially parallel with each other so as to fold the baby buggy.

The present invention relates to the twin-type baby buggy comprising at least one joint provided on each side of an interconnection between the push handle and the intermediate one of the handle pipes.

The present invention relates to the twin-type baby buggy comprising a pair of front interconnection bars provided between the left front leg and the intermediate front leg, and between the right front leg and the intermediate front leg; a pair of rear interconnection bars provided between the left rear leg and the intermediate rear leg, and between the right rear leg and the intermediate rear leg; and a pair of upper interconnection bars provided between a left interconnection bar and an intermediate interconnection bar, and between a right interconnection bar and the intermediate interconnection bar; and at least one joint being disposed on each of the front interconnection bars, each of the rear interconnection bars and each of the upper interconnection bars in alignment with the corresponding joint provided on the push handle.

The present invention relates to the twin-type baby buggy comprising a couple of joints provided on each side of the interconnection between the push handle and the intermediate handle pipe, on each of the front interconnection bars, on each of the rear interconnection bars and on each of the upper interconnection bars.

The present invention relates to the twin-type baby buggy comprising lock members for locking the left and the right rear legs to the left and the right handle pipes, which are provided on the left handle pipe and the right handle pipe.

The present invention relates to the twin-type baby buggy comprising operation members for operating the lock members, which are provided slidably on the left and the right handle pipes.

The present invention relates to the twin-type baby buggy comprising an interlocking member provided on one of the left and right front legs for engaging said one of the left and the right front legs with the other of the left and the right front legs when the baby buggy is folded.

The present invention relates to the twin-type baby buggy comprising the hook including a hold projected therefrom, which is to be held when the interlocking member is released from the other of the front legs.

The present invention relates to the twin-type baby buggy comprising a guard arm having a middle portion, and a left and a right portions, each being removably mounted on the front of the corresponding rest arm.

The present invention relates to the twin-type baby buggy comprising the guard arm divided in three segments, an intermediate segment of the guard removably mounted on the intermediate arm rest, a left and a right segments of the guard arm being removably connected to the intermediate segment mounted on the left and the right arm rests.

The present invention relates to the twin-type baby buggy comprising guard joints which are to be inserted into the corresponding ends of the intermediate segment of the guard arm and which are provided on free ends of the left and the right segments of the guard arm, and the guard joints having respective resilient engagement portions which are to be engaged into openings formed in the intermediate segment of the guard arm when the guard joints are inserted in the corresponding ends of the intermediate segment of the guard arm.

BRIEF DESCRIPTION OF THE DRAWINGS

FIG. 2 is a perspective view of the baby buggy shown in FIG. 1 with seats, shades, etc. mounted on.

FIG. 4 is a front view of the baby buggy shown in FIG. 3 with the seats, shads, etc. mounted on.

FIG. 5 is a partial sectional view: of the push handle.

FIG. 6A is a view explaining the positions of the rear wheels of the baby buggy which is three-folded.

FIG. 6B is a view explaining the positions of the rear wheels of the baby buggy which is five-folded.

FIG. 8 is a view of the hook for interlocking the left and the right front legs.

FIG. 9 is a plan view of the guard arm.

FIG. 10 is a view explaining the operation of attaching the guard arm to the arm rest.

BEST MODES OF PRACTICING THE INVENTION

An embodiment of the present invention will be explained with reference to the drawings attached hereto.

Figure 1:
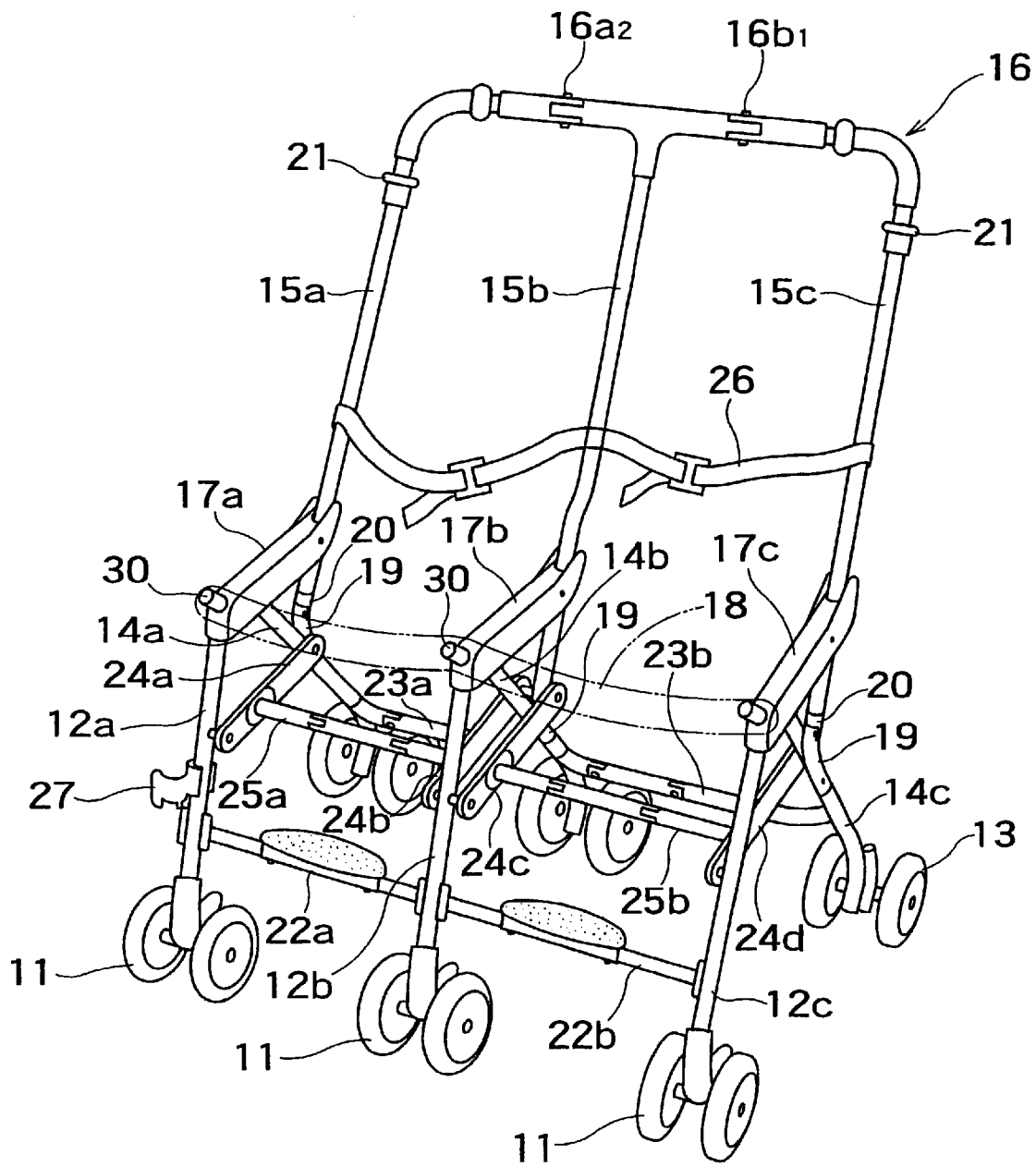
FIG. 1 is a perspective view of a twin-type baby buggy according to the present invention, which diagrammatically shows a structure thereof.

FIG. 1 is a perspective view of a twin-type baby buggy according to the present invention. The baby buggy has a couple of seats S laterally juxtaposed with each other. The baby buggy comprises three front legs 12a, 12b, 12c having front wheels 11, three rear legs 14a, 14b, 14c having rear wheels 13, a push handle 16 including three handle pipes 15a, 15b, 15c, and three arm rests 17a, 17b, 17c, and a guard arm 18 detachably mounted between the arm rests.

The arm rests 17a, 17b, 17c have one end pivotally connected to portions of the respective three handle pipes 15a, 15b, 15c near the ends thereof. The front legs 12a, 12b, 12c have upper ends pivotally connected to the other ends of the respective arm rests 17a, 17b, 17c. The rear legs 14a, 14b, 14c have upper ends pivotally connected to middle portions of the respective arm rests 17a, 17b, 17c. Brackets 19 bent in an L-shape have one end pivotally connected to middle portions of the rear legs 14a, 14b, 14c. The handle pipes 15a, 15b, 15c of the push handle 16 have respective ends pivotally connected to the middle portions of the respective brackets 19. In the unfolded state of the baby buggy, lock members 20 slidably mounted on the lower end of the left and the right handle pipes 15a, 15c are engaged with lock portions formed on the other ends of the left and the right brackets 19, 19 to retain the baby buggy in the unfolded state.

The lock members 20 are interconnected to operation members 21 slidably provided on the upper ends of the handle pipes 15a, 15c by interconnection rods (not shown) passed through the handle pipes 15a, 15c. The operation members 21 are normally urged downward, and set in the locked state in which the lock members 20 are locked with the locking portions of the left and the right brackets 19.

The front legs 12a, 12b and the front legs 12b, 12c are interconnected respectively by front interconnection bars 22a, 22b. The rear legs 14a, 14b and the rear legs 14b, 14c are interconnected respectively by rear interconnection bars 23a, 23b. Interconnection bars 24a, 24b, 24c, 24d have the front ends pivotally connected to the middle portions of the respective front legs 12a, 12b, 12c. The respective interconnection bars 24a, 24b, 24c, 24d have the rear ends pivotally connected to the brackets 19 and the ends of the handle pipes 15a, 15b, 15c. The interconnection bars 24a, 24b have the respective middle portions interconnected by an upper interconnection bar 25a, and the interconnection bars 24c, 24d have the respective middle portions interconnected by an. upper interconnection. bar 25b. Reference number 26 represents a belt which retains the seats S.

Figure 2:
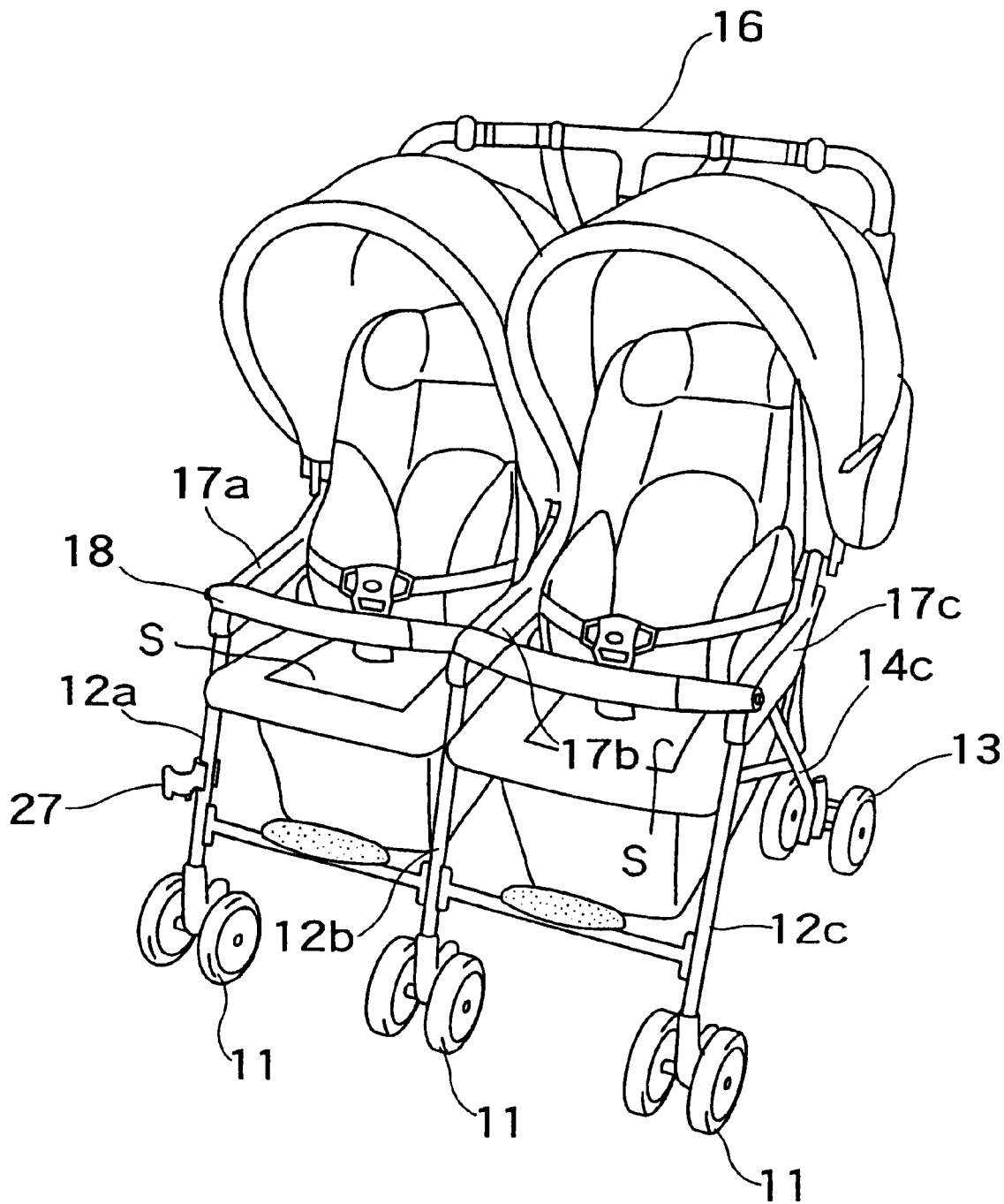

Thus, the lock members 20 provided on the lower ends of the handle pipes 15a, 15c are engaged with the locking portions provided on the upper ends of the brackets 19, whereby the baby buggy is retained in the usable unfolded state as shown in FIG. 1. FIG. 2 is a perspective view of the baby buggy furnished with the seats, shades, etc. which is in its unfolded state.

Figure 3:
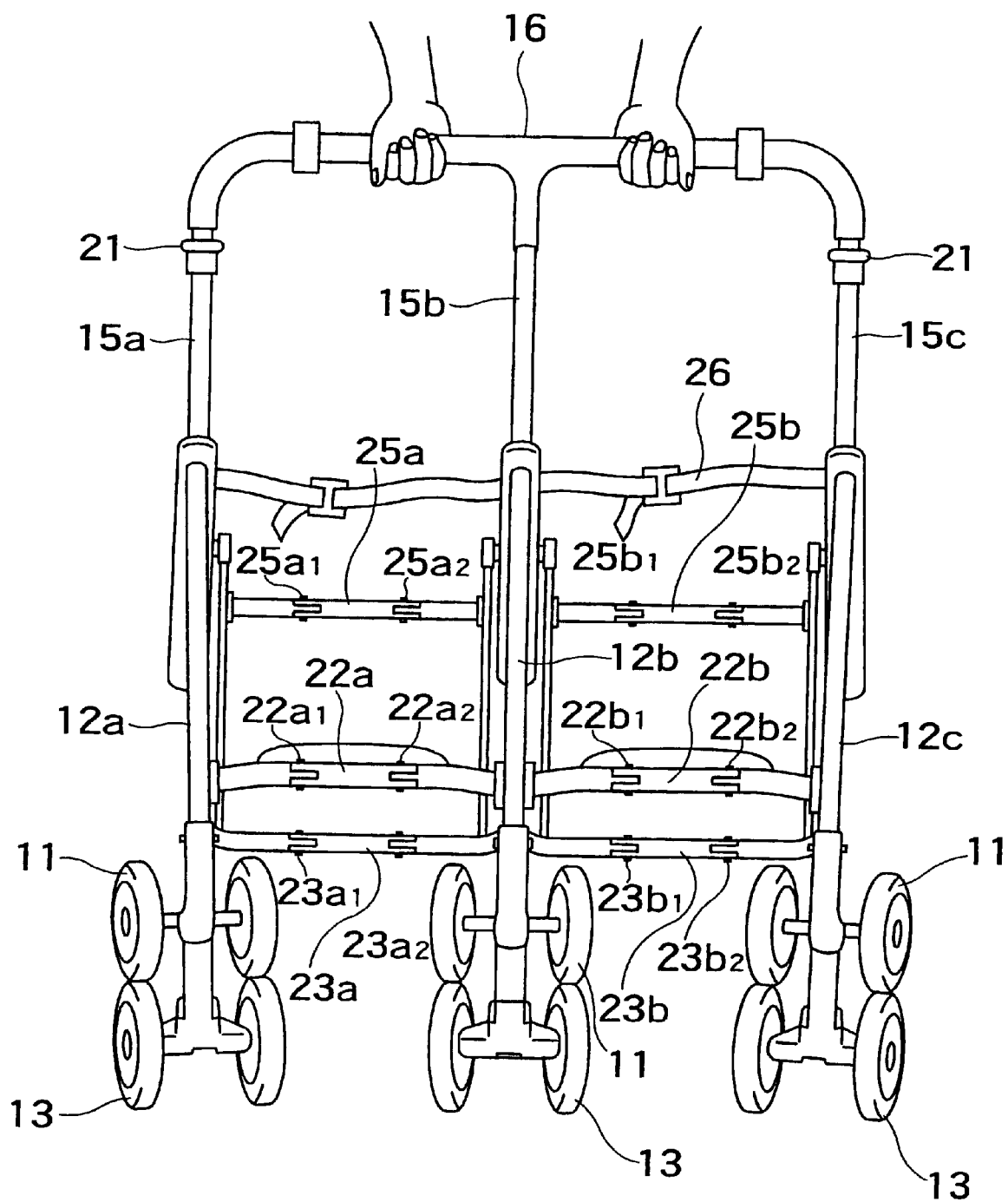
FIG. 3 is a front view of the baby buggy folded with the front legs and the rear legs substantially in parallel with each other.
Figure 4:
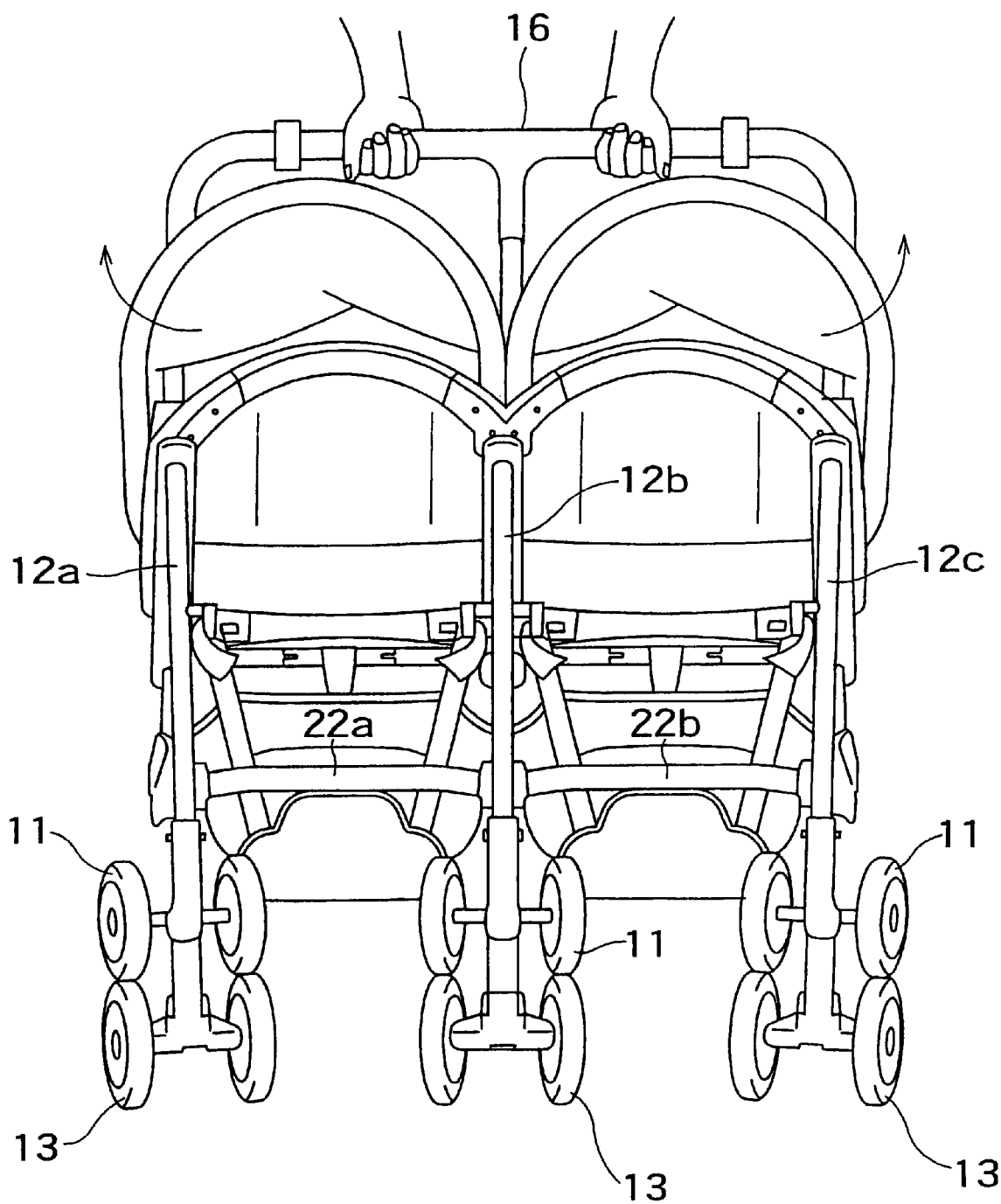

When the operation members 21 provided on the left and the right handle pipes 15a, 15c are pulled up, the lock members 20 are pulled up to disengage the lock members 20 fro the brackets 19, and the arm rests 17a, 17b, 17c, and the interconnection bars 24a, 24b, 24c, 24d can be made swingable upward around pivotal points with respect to the handle pipes 15a, 15b, 15c. Accordingly, as shown in FIGS. 3 and 4, when the push handle 16 is held and pushed down, while the above members on the side of the front wheels 11 are moved upward, the front legs 12a, 12b 12c and the rear legs 14a, 14b, 14c are swung to be substantially parallel with each other. The baby buggy can be folded in a thin manner in the fore and aft direction.

Joints $22a_1$, $22a_2$, $22b_1$, $22b_2$, $23a_1$, $23a_2$, $23b_1$, $23b_2$, $25a_1$, $25a_2$, $25b_1$, $25b_2$ are provided at two middle portions of the respective front interconnection bars 22a, 22b, the rear interconnection bars 23a, 23b and the upper interconnection bars 25a, 25b. These joints enable the baby buggy to be folded. As shown in FIG. 5, the push handle 16 has two couples of joints $16a_1$, $16a_2$; $16b_1$, $16b_2$ provided respectively on both sides of the interconnection of the push handle 16 between the intermediate handle pipe 15b and the push handle 16. The respective joints are arranged so that when the front legs 12a, 12b, 12c and the rear legs 14a, 14b, 14c are folded parallel with each other, the joints $16a_1$, $25a_1$, $22a_1$, $23a_1$, the joints $16a_2$, $25a_2$, $22a_2$, $23a_2$, the joints $16b_1$, $25b_1$, $22b_1$, $23b_1$, and the joints $16b_2$, $25b_2$, $22b_2$, $23b_2$ are positioned respectively on the same axial lines, and the axial lines are parallel with each other.

In such arrangement, the front legs: 12a, 12b, 12c and the rear legs 14a, 14b, 14c are folded in parallel with each other as shown in FIGS. 3 and 4. Then, the portions of the push handle 16 outside the joints $16a_2$, $16b_1$, are moved forward, and the outer portions of the push handle 16, the upper interconnection rods 25a, 25b, the front interconnection rods 22a, 22b and the rear interconnection rods 23a, 23b, which are respectively outside the joints $16a_2$, $25a_2$, $22a_2$, $23a_2$ and the joints $16b_1$, $25b_1$, $22b_1$, $23b_1$, are folded forward by the joints the joints $16a_2$, $25a_2$, $22a_2$, $23a_2$ and the joints $16b_1$, $25b_1$, $22b_1$, $23b_1$. Thus, the baby buggy can be triple-folded. FIG. 6A shows the positions and orientations of the rear wheels 13 when the baby buggy is triple-folded. The rear wheels are positioned at the summits of a triangle, and an interval between the juxtaposed rear wheels 13, 13 is $L_1$. The baby buggy get to have a reduced and compact lateral width reduced compact.

Figure 7:
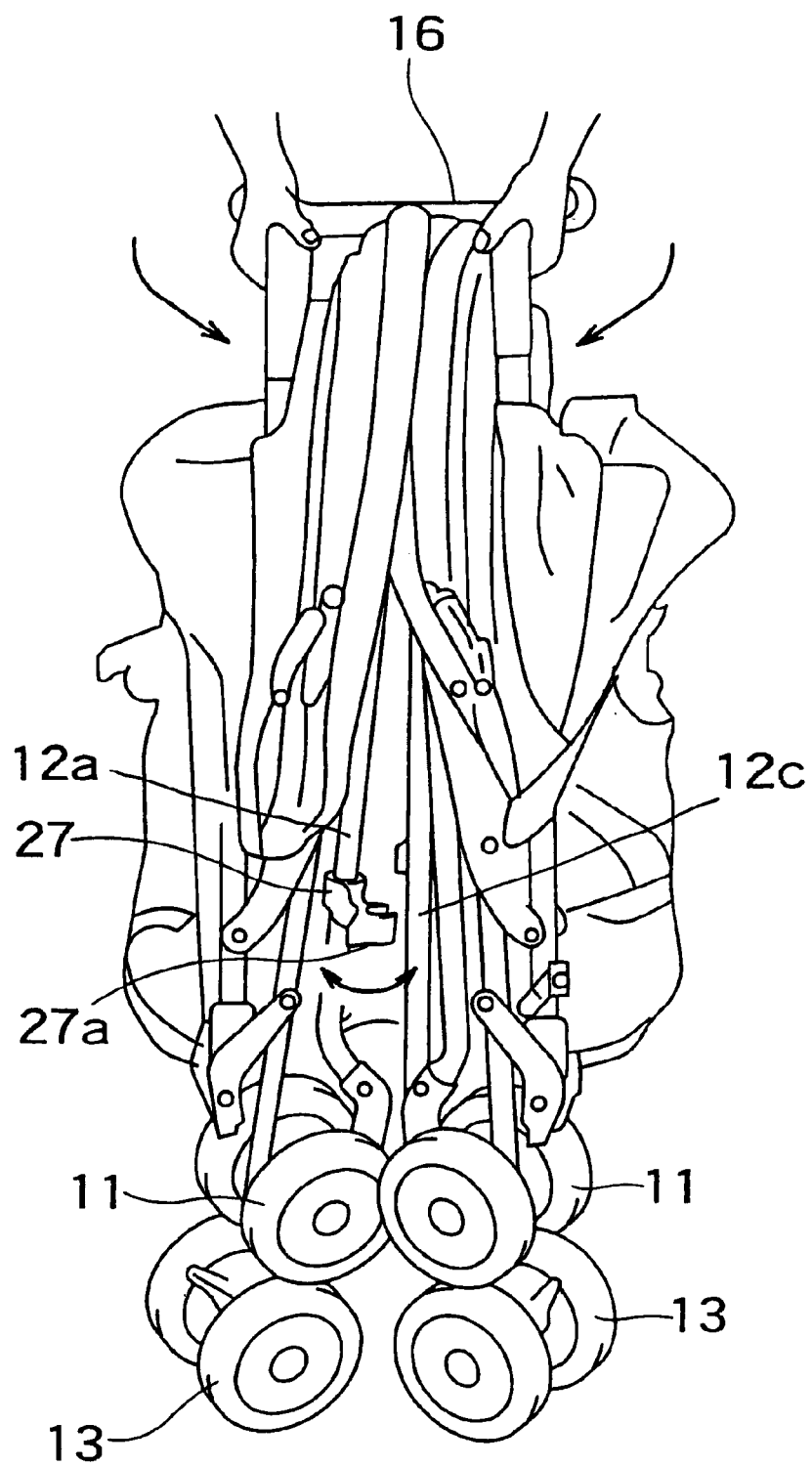
FIG. 7 is a front view of the five-folded baby buggy.

Then, when both ends of the push handle 16 are further swung toward the forward ends, the outer portions of the push handle 16, the upper interconnection rods 25a, 25b, the front interconnection rods 22a, 22b and the rear interconnection rods 23a, 23b are folded so that the outer portions can be closer to each other to be so-called quintuple-folded. In this way, the baby buggy can be folded further compactly. FIG. 7 shows the quintuple-folded state of the baby buggy. FIG. 6B shows the positions and the orientations of the rear wheels 13 when the baby buggy is quintuple-folded. The rear wheels 13 are positioned at the summits of a triangle and oriented in a radial direction. An interval between the rear wheels 13 is $L_2$ which can be smaller in comparison with the interval $L_1$ at the time when the baby buggy is triple-folded. Furthermore, when the baby buggy is stood in the above-described quintuple-folded state on a floor or others, the baby buggy is supported on the three radially oriented rear wheels 13 with improved stability.

As shown in FIG. 7, a locking member 27 having a hook 27a which is engageable with the front leg 12c is mounted on the front leg 12a. FIG. 8 is a perspective view of the locking member 27. The hook 27a is formed in the shape of an arc which is engageable with the front leg 12c. A hold member 27b which is to be held when the front leg 12c is disengaged, is formed on the outer side of the hook 27a integral with the hook 27a. After the baby buggy is quintuple-folded as described above, the hook 27a of the locking member 27 is engaged with the front leg 12c to thereby interconnect the front legs 12a, 12c, whereby the fivefold state can be secured. When the baby buggy is unfolded, the hold member 27b is held to disengage the hook 27a from the front leg 12c, whereby the quintuple-folded state of the baby buggy can be easily released.

As indicated by the two-dot chain line in FIG. 1, a flexible guard arm 18 is detachably mounted between the forward ends of the respective arm rest 17a, 17b, 17c. As shown in FIG. 9. the guard arm 18 is formed of two arcuate segments. The guard arm 18 has the middle portion detachably mounted on the intermediate arm rest 17b and has the left and the right end detachably mounted on the arm rests 17a, 17c. Projections 30 are jutted on the upper portions of the forward ends of the respective arm rests 17a, 17b, 17c, and each projection 30 has locking pins 30a which are urged to project in left and right directions. The guard arm 18 has openings in the left and the right ends and the middle portion, into which the projections 30 are inserted. The locking pins 30a engage into circumferential grooves formed in the openings, whereby the guard arm 18 is attached to the arm rests 17a, 17b, 17c at three points. Furthermore, as shown in FIG. 10, slide levers 31 provided near the respective openings in the guard arm 18 are pushed to thereby disengage the locking pins 30a from the circumferential grooves in the guard arm 18, and the guard arm 18 can be detached from the arm rests 17a, 17b, 17c.

However, a conventional guard arm is formed in one piece, and even when a baby is placed on one of the seats, at least the middle portion and one of the ends of the guard arm need to be detached from the arm rests. Thus, it is inconvenient to take the baby on or out of the seat.

According to the present invention, however, the guard arms 18 consists of three segments which can be interconnected to each other.

Figure 11:
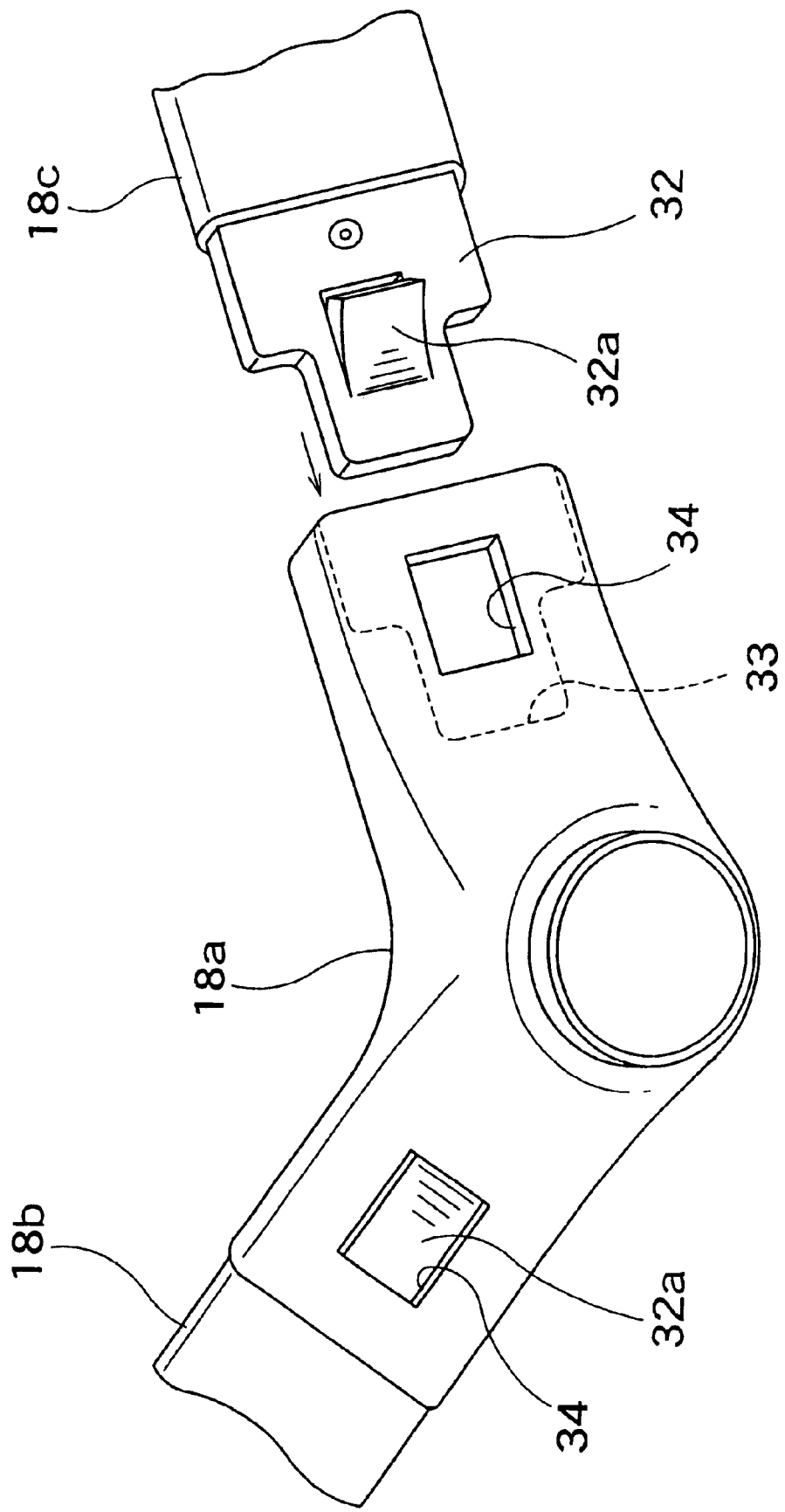
FIG. 11 is a view of the connection between the intermediate guard arm segment to the left and the right guard arm segments.

Specifically, the guard arm 18 has a relatively short intermediate guard arm segments 18a attached to the middle arm rest 17b, and left and right guard arm segments 18b, 18c. FIG. 11 is a perspective view showing interconnections between the segments 18a, 18b, 18c of the guard arm 18, which is viewed from below. Guard joints 32 which can be inserted into holes 33 formed axially in the intermediate guard arm segment 18a, are secured respectively to forward ends of the guard arm segments 18b, 18c of the guard arm 18. The guard joints 32 respectively have resilient engagement pieces 32a biased downwardly. On the other hand, openings 34 into which the resilient engagement pieces 32a are engaged, are formed in the intermediate guard arm segment 18a. Thus, when the guard arm segment 18b or 18c is connected to the intermediate guard arm segment 18a, the guard joint 32 of the guard arm segment 18b or 18c is inserted into the hoe 33 in the intermediate guard arm segment 18a, and the resilient engagement piece 32a is engaged into the opening 34, whereby the guard arm segments 18a, 18b, 18c are connected. When the connection guard arm segments 18a, 18b, 18c are separated from each other, the resilient engagement piece 32a is pushed inward from the outside of the opening 34, the resilient engagement piece 32a is disengaged from the opening 34, and the guard arm segments 18b, 18c can be easily disconnected from the intermediate guard arm segment 18a.

Thus, when a baby is taken on or out of one of the seats, one of the guard arm segments 18b, 18c associated with the seat is disengaged from the intermediate guard arm segment 18a and is turned in a direction in which the guard arm segment is not hindered. A baby can be thus easily placed on and off the seat.

As described above, the baby buggy according to the present invention can be folded with the front legs and the rear legs substantially in parallel with each other, and at least one joint is provided on each side of the push handle outside the interconnection of the middle handle pipe and the push handle, on each of the front interconnection bars interconnecting the middle front leg and the left and right front legs, on each of the rear interconnection bars interconnecting the middle rear leg and the left and right rear legs, and on each of the upper interconnection bars interconnecting the middle interconnectio[008e] bar and the left and right interconnection bars so that the joints are positioned on the same axial line when the front legs and the rear legs are folded substantially in parallel with each other. The respective joints permit the baby buggy to be at least triple-folded, which facilitates carrying and storing the baby buggy. Furthermore, in the triple-folded state, the rear wheels: are located at three positions, which enables the baby buggy to stand stably by itself on a floor or the like. The guard arm can be divided into three segments. In a case where the intermediate guard arm segment is detachably mounted on the middle armrest, and the left and the right guard arm segments mounted respectively on the left and the right arm rests are disengageably connected to the intermediate guard arm segment, when a baby is placed. in only one of the seats, t h e guard arm segment alone corresponding to the seat is detached, which can facilitate attaching and detaching the guard arm and accordingly can facilitate taking a baby on and out of the seat.

What is claimed is:

1. A twin-type baby buggy comprising:

a U-shaped push handle interconnecting with three handle pipes extending parallel with each other;

front legs with front wheels mounted on;

rear legs with rear wheels mounted on;

arm rests each having one end pivotally connected to the corresponding handle pipe, the other end pivotally connected to the corresponding front leg and the middle portion connected to the corresponding rear leg; and interconnection bars interconnecting the front legs to the respective corresponding handle pipes, the arm rests and the interconnection bars being swung upwardly with respect to the handle pipes to bring the front legs and the rear legs substantially parallel with each other so as to fold the baby buggy;

at least one foldable joint provided on each side of an interconnection between the push handle and the intermediate one of the handle pipes, so that said push handle is triple folded and said baby buggy is at least triple folded.

2. The twin-type baby buggy according to claim 1, further comprising a pair of front interconnection bars provided between the left front leg and the intermediate front leg, and between the right front leg and the intermediate front leg; a pair of rear interconnection bars provided between the left rear leg and the intermediate rear leg, and between the right rear leg and the intermediate rear leg; and a pair of upper interconnection bars provided between a left interconnection bar and an intermediate interconnection bar, and between a right interconnection bar and the intermediate interconnection bar; and at least one joint being disposed on each of the front interconnection bars, each of the rear interconnection bars and each of the upper interconnection bars in alignment with the corresponding joint provided on the push handle.

3. The twin-type baby buggy according to claim 2, wherein a couple of joints are provided on each side of the interconnection between the push handle and the intermediate handle pipe, on each of the front interconnection bars, on each of the rear interconnection bars and on each of the upper interconnection bars.

4. The twin-type baby buggy according to claim 1, wherein lock members for locking the left and the right rear legs to the left and the right handle pipes are provided on the left handle pipe and the right handle pipe.

5. The twin-type baby buggy according to claim 4, wherein operation members for operating the lock members are provided slidably on the left and the right handle pipes.

6. The twin-type baby buggy according to claim 1, wherein an interlocking member is provided on one of the left and right front legs for engaging said one of the left and the right front legs with the other of the left and the right front legs when the baby buggy is folded.

7. The twin-type baby buggy according to claim 6, wherein a hook includes a hold projected therefrom, which is to be held when the interlocking member is released from the other of the front legs.

8. The twin-type baby buggy according to claim 1, further comprising a guard arm having a middle portion, and a left and a right portions, each removably mounted on the front of the corresponding arm rest.

9. The twin-type baby buggy according to claim 8, wherein the guard arm is divided in three segments, an intermediate segment of the guard arm is removably mounted on the intermediate arm rest, a left and a right segments of the guard arm removably connected to the intermediate segment mounted on the left and the right arm rests.

10. The twin-type baby buggy according to claim 9, wherein guard joints which are to be inserted into the corresponding ends of the intermediate segment of the guard arm are provided on free ends of the left and the right segments of the guard arm, and the guard joints have respective resilient engagement portions which are to be engaged into openings formed in the intermediate segment of the guard arm when the guard joints are inserted in the corresponding ends of the intermediate segment of the guard arm.

* * * * *